United States Patent
Ronchetto (10) Patent No.: US 11,894,737 B2
(45) Date of Patent: Feb. 6, 2024

(54) DUAL-WINDING SYNCHRONOUS RELUCTANCE MACHINE COMPOSED OF AN EXCITATION WINDING AND A SEPARATE POWER WINDING

(71) Applicant: GE Avio S.r.l., Rivalta di Torino (IT)

(72) Inventor: Davide Ronchetto, Cuorgne (IT)

(73) Assignee: GE Avio S.r.l., Rivalta di Torino (IT)

( * ) Notice: Subject to any disclaimer, the term of this patent is extended or adjusted under 35 U.S.C. 154(b) by 525 days.

(21) Appl. No.: 16/606,006

(22) PCT Filed: May 15, 2018

(86) PCT No.: PCT/US2018/032690
§ 371 (c)(1),
(2) Date: Oct. 17, 2019

(87) PCT Pub. No.: WO2018/195559
PCT Pub. Date: Oct. 25, 2018

(65) Prior Publication Data
US 2021/0211028 A1    Jul. 8, 2021

(30) Foreign Application Priority Data
Apr. 18, 2017 (EP) ..................... 17425042

(51) Int. Cl.
*H02K 19/26* (2006.01)
*H02K 3/28* (2006.01)
(Continued)

(52) U.S. Cl.
CPC ............... *H02K 19/26* (2013.01); *H02K 3/28* (2013.01); *H02K 11/042* (2013.01); *H02M 7/00* (2013.01); *H02P 27/06* (2013.01)

(58) Field of Classification Search
CPC ........ H02K 19/26; H02K 3/28; H02K 11/042; H02K 11/048; H02P 27/00
See application file for complete search history.

(56) References Cited

U.S. PATENT DOCUMENTS 4,093,869 A * 6/1978 Hoffmann ............... H02K 19/12
290/46
4,743,777 A    5/1988 Shilling et al.
(Continued)

FOREIGN PATENT DOCUMENTS

CN        103986293 A     8/2014
DE    102007018485 A1    11/2007
(Continued)

OTHER PUBLICATIONS

Jovanovic M G et al: "Power Factor Control Using Brushless Doubly Fed Reluctance Machines", Conference Record of the 2000 IEEE Industry Applications Conference. 35th IAS Annual Meeting and World Conference on Industrial Applications of Electrical Energy. Rome, Italy, Oct. 8-12, 2000; [Conference Record of the IEEE Industry Applications Co, vol. CONF. 35, Oct. 8, 2000 (Oct. 8, 2000), pp. 523-530, XP001043136, DOI: 10.1109/IAS.2000. 881160 +.
(Continued)

*Primary Examiner* — Zoheb S Imtiaz
(74) *Attorney, Agent, or Firm* — Fitch, Even, Tabin & Flannery LLP (57) ABSTRACT

A rotating field machine (200) including a stator (140) and a rotor (150) are provided. In particular, a dual-winding rotating field machine (200) in which the stator (140) includes two separate windings can be provided. In one example implementation, the stator (140) can include an excitation winding (220) configured to control an excitation current and a power winding (230) configured to control power flow to an electrical system. The dual-winding rotating field machine (200) can further include a starting mode and a generating mode. During the starting mode, both the excitation winding (220) and the power winding (230) can be coupled to one or more switching power converters (170). During the generating mode, the power winding (230) can (Continued)

be coupled to a variable frequency bus and the power converter (170) can be used to manage excitation power only.

11 Claims, 4 Drawing Sheets

(51) Int. Cl.
*H02K 11/042* (2016.01)
*H02P 27/06* (2006.01)
*H02M 7/00* (2006.01)

(56) References Cited

U.S. PATENT DOCUMENTS

| | | | | |
|---|---|---|---|---|
| 4,772,802 | A | * | 9/1988 | Glennon ............ F02N 11/04 290/31 |
| 5,083,077 | A | | 1/1992 | Wallace et al. |
| 5,493,201 | A | | 2/1996 | Baker |
| 5,811,905 | A | | 9/1998 | Tang |
| 6,472,841 | B1 | | 10/2002 | Piedl et al. |
| 7,227,271 | B2 | | 6/2007 | Anghel et al. |
| 7,301,310 | B2 | | 11/2007 | Ganev et al. |
| 8,097,968 | B2 | | 1/2012 | Anghel et al. |
| 8,593,030 | B2 | | 11/2013 | Mondal et al. |
| 9,209,741 | B2 | | 12/2015 | Gao et al. |
| 2003/0034755 | A1 | | 2/2003 | Krefta et al. |
| 2005/0162030 | A1 | | 7/2005 | Shah et al. |
| 2005/0184698 | A1 | | 8/2005 | Anghel et al. |
| 2007/0046266 | A1 | * | 3/2007 | Ganev ................ H02P 9/48 322/28 |
| 2010/0207479 | A1 | * | 8/2010 | Madawala ........... H02K 17/42 322/47 |
| 2015/0102606 | A1 | | 4/2015 | Shah et al. |
| 2016/0336928 | A1 | | 11/2016 | Kuznetsov |
| 2018/0034395 | A1 | * | 2/2018 | Huang ................ H02P 9/302 |

FOREIGN PATENT DOCUMENTS

| | | | |
|---|---|---|---|
| EP | 1716630 | | 9/2005 |
| EP | 2410639 | A2 | 1/2012 |
| GB | 232968 | A | 7/1926 |
| JP | 10225098 | | 8/1998 |
| JP | 2003021029 | | 1/2003 |
| JP | 2016167903 | A * | 9/2016 |
| KR | 201021214 | | 2/2010 |

OTHER PUBLICATIONS

Sul Ademi et al: "Vector control strategies for brushless doubly-fed reluctance wind generators", Environment Friendly Energies and Applications (EFEA), 2012 2nd International Symposium on, IEEE, Jun. 25, 2012 (Jun. 25, 2012), pp. 44-49, XP032231059, DOI: 10.1109/EFEA.2012.6294084 ISBN: 978-1-4673-2909-5.
PCT International Search Report Corresponding to PCT/US2018/032690 dated Jan. 25, 2019.
European Search Report Corresponding to Application No. 17/425,042 dated Sep. 22, 2017.
Stumberger et al, "Design of synchronous reluctance generator with dual stator windings an anisotropic rotor with flux barriers", Przeglad Elektrotechniczny, vol. R.88, No. 12b, Dec. 1, 2012, pp. 16-19.
A.M. Knight, "Design and Analysis of Brushless Doubly Fed Reluctance Machines", 2013 (Copyright 2011); 9 pgs.
R.E. Betz, et al. "The Brushless Doubly Fed Reluctance Machine and the Synchronous Reluctance Machine—A Comparison", 2000; pp. 854-861.

* cited by examiner

DUAL-WINDING SYNCHRONOUS RELUCTANCE MACHINE COMPOSED OF AN EXCITATION WINDING AND A SEPARATE POWER WINDING

FIELD

The present subject matter relates generally to rotating field machines.

BACKGROUND

Rotating electric machines are used for a wide variety of applications, such as automotive applications, aerospace applications, marine applications, industrial applications, and numerous other applications. A rotating electric machine can be an electrical motor. The rotor configured to rotate with respect to the stator to convert electrical energy to mechanical energy. Rotating electrical machines also include electric generators. The relative rotation between the rotor and the stator can convert mechanical energy to electrical energy.

One example of an electric generator is an electric generator that is used onboard an aircraft. In aeronautical applications, the variable frequency starter-generator (VFSG) is commonly used for the motor/generator. In conventional applications, rotating field machines and other machines (e.g., synchronous reluctance machines, induction machines, etc.) require the machine to be coupled to a DC/AC converter in order to control power applied to a load. The power converter has to manage all the power flowing from the machine to an electrical system leading to a machine with decreased overall reliability and an increased cost, volume and weight.

BRIEF DESCRIPTION

Aspects and advantages of embodiments of the present disclosure will be set forth in part in the following description, or can be learned from the description, or can be learned through practice of the embodiments.

One example aspect of the present disclosure is directed to a rotating field machine. The rotating field machine includes a stator and a rotor. The rotor being mounted for rotation with respect to the stator. The stator includes a first winding. The first winding can be an excitation winding configured to receive an excitation current. The stator further includes a second winding. The second winding can be a power winding configured to accommodate power flow through the rotating field machine.

In some embodiments, the excitation winding and the power winding are located in the stator such that the excitation winding and power winding are in electrical quadrature with respect to one another. In some embodiments, the excitation winding is 90° out of electrical phase with respect to the power winding. In some embodiments, the excitation winding is associated with d-axis current and the power winding is associated with q-axis current for the rotating field machine.

In some embodiments, the rotating field machine is coupled to a control system, the control system configured to operate the rotating field machine in a starting mode and in a generating mode. In some embodiments, during the starting mode, both the excitation winding and the power winding are coupled to one or more power converters. In some embodiments, the power winding is coupled to a DC bus via a bridge rectifier. In some embodiments, during the generating mode, the power winding is coupled to a variable frequency constant voltage bus. In some embodiments, a control device is configured to control the power converter to manage excitation current flowing in the excitation winding to control a generated power in the power winding. In some embodiments, the rotating field machine is a synchronous reluctance machine.

Another example aspect of the present disclosure is directed to a control system for operating a rotating field machine. The rotating field machine includes a stator and a rotor. The rotor can be mounted for rotation with respect to the stator. The stator includes an excitation winding configured to receive an excitation current. The stator further includes a power winding configured to accommodate power flow in the rotating field machine. The control system can be configured to perform operations. The operations can include determining to operate the rotating field machine in a starting mode. During the starting mode, the operations can include energizing the excitation winding and the power winding with a power converter. The operations further include operating the power converter to start the rotating field machine. The operations further include determining to operate the rotating field machine in a generating mode. During the generating mode, the operations include decoupling the power winding from the power converter. The operations further include operating the power converter to manage excitation current flowing in the excitation winding to control a generated power in the power winding.

In some embodiments, during the generating mode, the operations comprise coupling the power winding to a DC bus via a rectifier. In some embodiments, during the generating mode, the operations comprise coupling the power winding to an AC bus. In some embodiments, the excitation winding and the power winding are located in the stator such that the excitation winding and the power winding are in electrical quadrature with respect to one another. In some embodiments, the excitation winding is positioned 90° out of electrical phase with respect to the power winding.

Yet another example aspect of the present disclosure is directed to a method of operating a rotating field machine. The rotating field machine includes a stator and a rotor. The rotor can be mounted for rotation with respect to the stator. The stator includes an excitation winding configured to receive an excitation current. The stator further includes a power winding configured to accommodate power flow through the rotating field machine. The method further includes determining to operate the rotating field machine in a starting mode. During the starting mode, the method includes energizing the excitation winding and the power winding with a power converter. The method further includes operating the power converter to start the rotating field machine. The method further includes determining to operate the rotating field machine in a generating mode. During the generating mode, the method includes decoupling the power winding from the power converter. The method further includes operating the power converter to manage excitation current flowing in the excitation winding to control a generated power in the power winding.

In some embodiments, the excitation winding and the power winding are located in the stator such that the excitation winding and power winding are in electrical quadrature with respect to one another. In some embodiments, the excitation winding is positioned 90° out of electrical phase with the power winding. In some embodiments, during the generating mode, the method comprises coupling the power winding to a DC bus via a rectifier. In some embodiments, during the generating mode, the method comprises coupling the power winding to an AC bus.

Variations and modifications can be made to these example embodiments. These and other features, aspects and advantages of various embodiments will become better understood with reference to the following description and appended claims. The accompanying drawings, which are incorporated in and constitute a part of this specification, illustrate embodiments of the present disclosure and together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to a dual-winding rotating field machine. In aeronautic applications, the variable frequency starter-generator (VFSG) can be a commonly used machine for the motor/generator. The VFSG can have a complex design including electromagnetic components with many rotating elements as well as cooling components for the many sources of heat. In order to control the power applied to the loads, some applications require the machines to be coupled to a switching power converter. The converter has to manage all the power that is flowing from the machine to the electrical system during a starting mode. This can reduce the reliability of the machine and can increase the weight, volume and cost of the machine.

According to example embodiments of the present disclosure, a dual-winding rotating field machine, such as a modified synchronous reluctance machine, can be provided. In example embodiments, the machine can have a stator that has two separate windings (dual-winding machine). The first winding can be used to control an excitation current and the second winding can be used to control a main power flow. As a result of the stator having two separate windings, the switching power converter can be responsible for managing the excitation winding only.

For instance, in some embodiments, the machine can be operated in a starting mode or a generating mode. In a starting mode, both windings can be coupled to one or more power converters. In a generating mode the power winding can be coupled to a DC bus with a diode bridge in between. The diode bridge rectifier can be obtained from the same converter legs used for hard switching (free wheel diodes) or integrated in the power converter. Alternatively, the power winding can be coupled to a variable frequency constant voltage (or AC) bus without any power electronics in between. As a result, the power converter can be used to manage the excitation power only.

In this way, example aspects of the present disclosure can provide a number of technical effects and benefits. For instance, a stator with two separate windings can allow the power converter to deal with a reduced proportion of the total power. As a result, there can be an increase in reliability and a reduction in weight, volume and cost of the power converter used for excitation.

Referring now to the figures, example aspects of the present disclosure will be discussed in greater detail.

Figure 1:
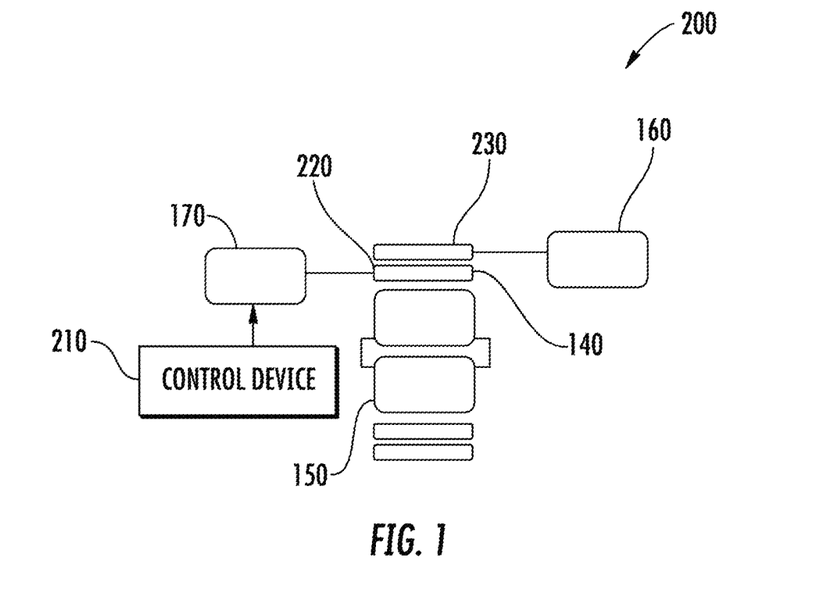
FIG. 1 depicts a block diagram of the components of an example rotating field machine according to example embodiments of the present disclosure.

FIG. 1 depicts a block diagram of an example dual-winding rotating field machine 200 according to example embodiments of the present disclosure. Machine 200 can be a synchronous reluctance machine or any other type of rotating field machine (e.g., permanent magnet assisted synchronous reluctance machine), an induction machine, an interior permanent magnet machine, surface mounted permanent magnet machine. The machine 200 can include a rotor 150 and a stator 140. The rotor 150 can be mounted for rotation with respect to the stator 140. In example embodiments, the stator 140 can include a first winding and a second winding. The first winding can be an excitation winding 220. The second winding can be a power winding 230. In some embodiments, the power winding 230 can be coupled to a main rectifier 160 to rectify the power. Power generated by the machine 200 can be applied to many different applications including, but not limited to, automotive and aeronautical applications.

Figure 4:
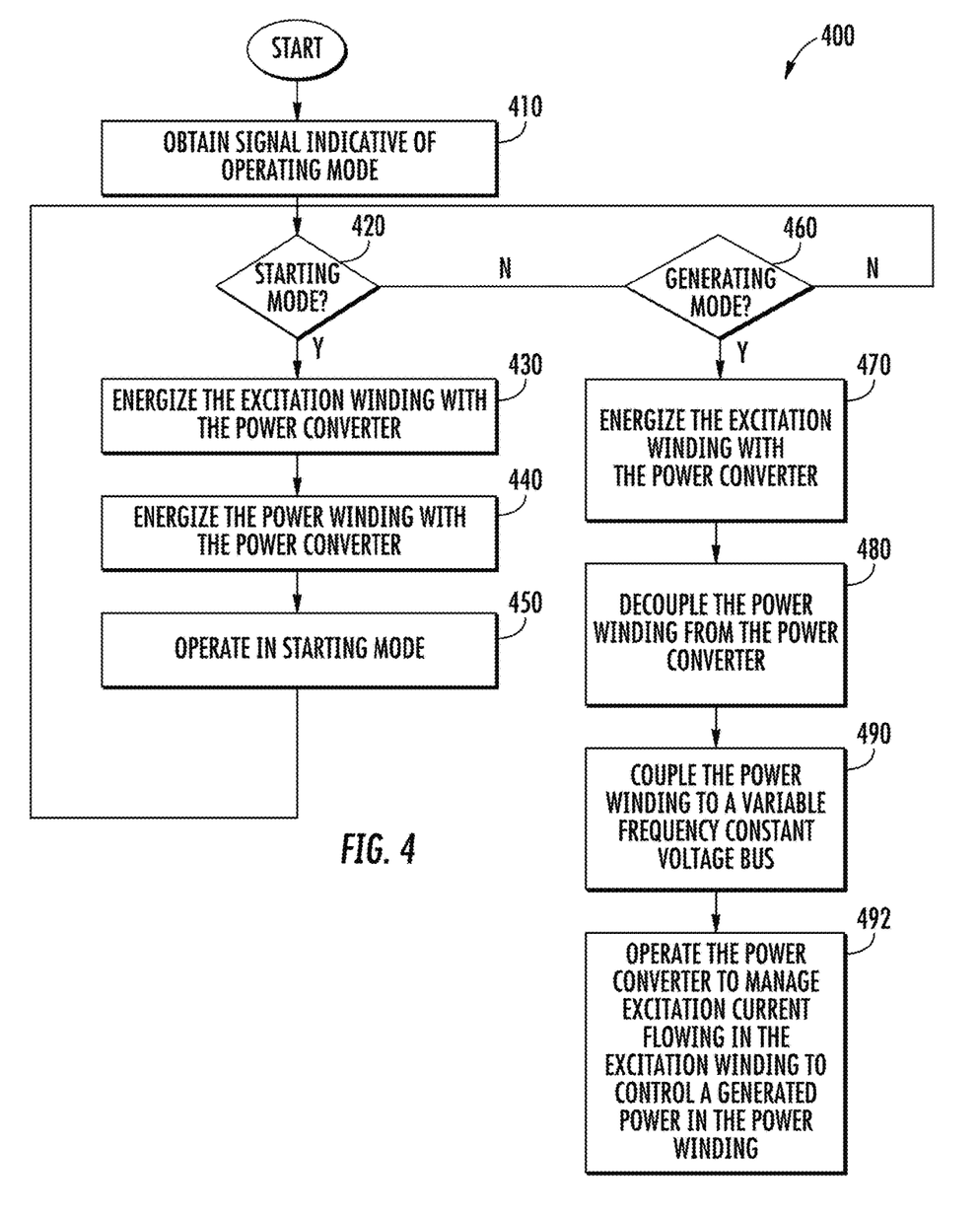
FIG. 4 depicts a flow diagram of an example method according to example embodiments of the present disclosure.

Machine 200 can include a switching power converter 170. Power converter 170 can be used to convert DC power to AC power. In example embodiments, power converter 170 can be configured for operation using a pulse width modulation (PWM) arrangement of insulated gate bipolar transistors (IGBTs) switching devices or other switching devices. A control device 210 can be configured to control operation of the converter by providing one or more gating commands to the switching devices. The control device 210 can be configured to control operations of machine 200 according to example embodiments of the present disclosure. FIG. 4, discussed below, shows one example of a flow diagram that can be implemented using control device 210. There can be multiple converters 170 depending on needs and design.

Figure 2:
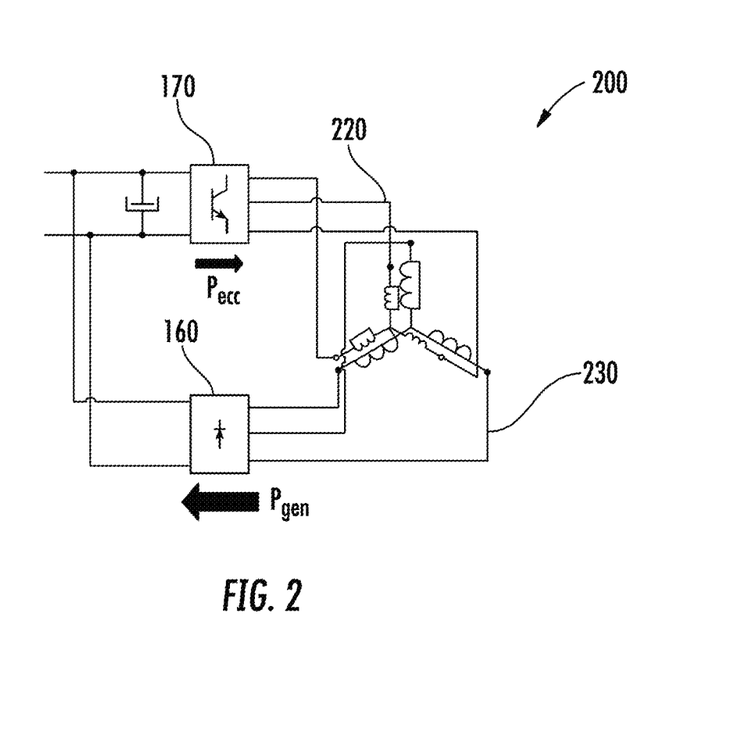
FIG. 2 depicts a circuit diagram of an example dual-winding rotating field machine according to example embodiments of the present disclosure.

FIG. 2 depicts a circuit diagram of an example dual-winding rotating field machine 200 when operating in a generating mode. According to example aspects of the present disclosure, the excitation winding 220 can be coupled to the power converter 170. The power winding 230 can be coupled to a DC bus with a diode bridge rectifier 160 in between. Excitation winding 220 and power winding 230 can be located in the stator 140 such that the excitation winding 220 and the power winding 230 are in electrical quadrature. In this way, the excitation winding 220 can be associated with d-axis components and the power winding 230 can be associated with q-axis components. D-axis and q-axis have been here defined following the well-known theory of Clarke and Park transformation, the d-axis being aligned with the main rotor flux. In example embodiments, the excitation winding 220 can be positioned 90° out of electrical phase with respect to the power winding 230. By designing the stator 140 to have two separate windings in quadrature with each other and physically splitting the d-axis and q-axis components (the rotating magnetic field and currents), the power converter 170 can be responsible for managing the excitation power only. Thus, power converter 170 can be designed to have a reduced size, weight and volume.

Figure 3:
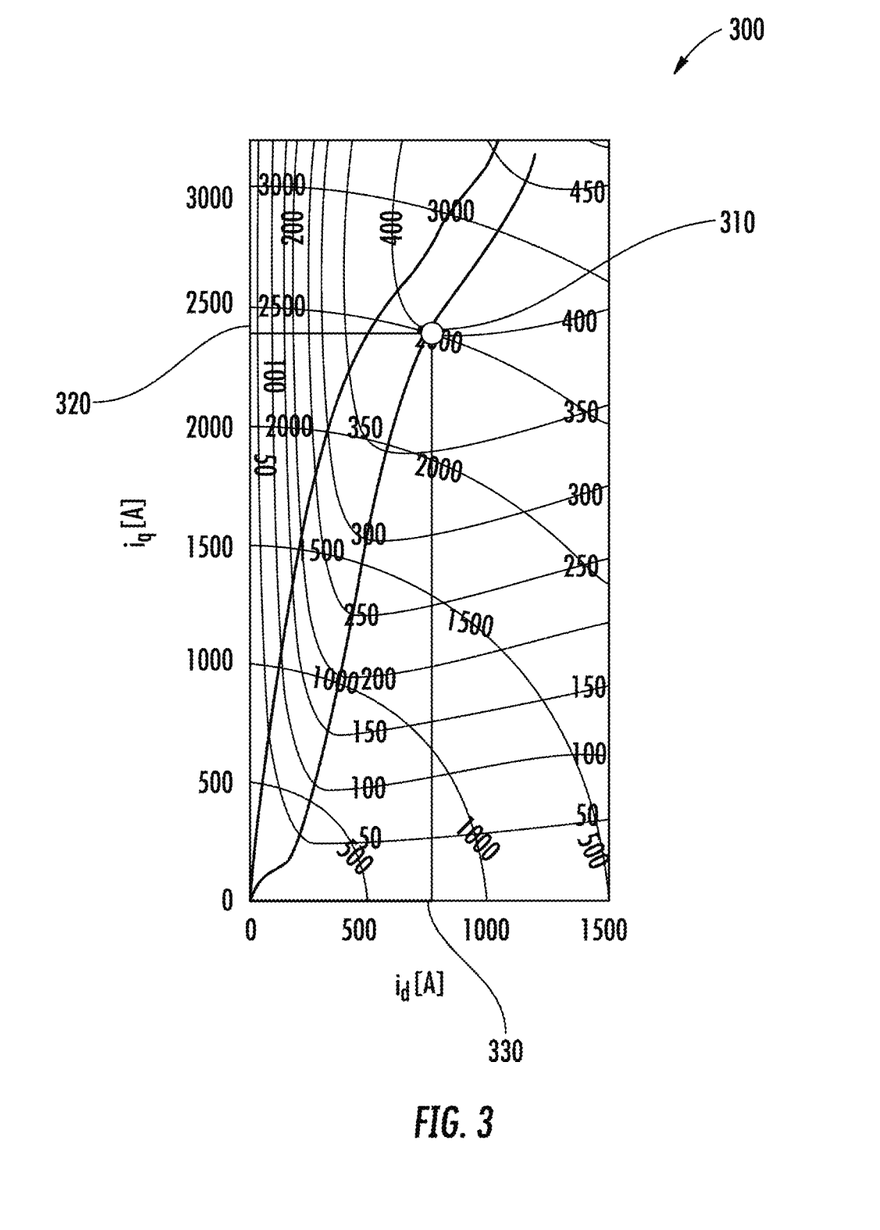
FIG. 3 depicts a plot diagram of an example rotating field machine current according to example embodiments of the present disclosure.

FIG. 3 depicts a plot diagram 300 representation of the d-axis current versus the q-axis current of a synchronous reluctance machine according to example embodiments of the present disclosure. The d-axis current is represented by Id and the q-axis current is represented by $I_q$. According to example aspects of the present disclosure, the stator 140 of dual-winding reluctance machine 200 can be designed with two separate windings to physically separate the d-axis current and the q-axis current. As a result, the power converter 170 can be used to control the excitation power only. As shown in the plot diagram 300, at point 310, the maximum d-axis current 330 ($I_{dmax}$) is less than the maximum q-axis current 320. According to example embodiments of the present disclosure, the power converter 170 only has to manage the d-axis current (and d-axis power). As a result, the power converter 170 can be designed such that it is sized to handle the d-axis power only. Although not shown plot diagram 300, the d-axis voltage can be less than the q-axis voltage thus leading to an advantage (on apparent power V*I) that is even more than the simple d-axis v. q-axis current ratio. Thus, the power converter 170 can be designed to have a reduced size, weight, and volume while increasing reliability. For example, the present disclosure can be advantageous in managing power in aeronautical applications where the power needs of an aircraft can be up to several kilowatts (kW) or several hundred kilowatts (kW) of power.

FIG. 4 depicts a flow diagram of an example method 400 according to example embodiments of the present disclosure. FIG. 4 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure. Method 400 can be performed by control device 210 or by separate devices.

At (410) the method can include obtaining, from control device 210, a signal indicative of an operating mode. The operating mode can be either a starting mode or a generating mode.

At (420) the method can include determining whether the operating mode is a starting mode. If the operating mode is not the starting mode, the method can proceed to (460) to determine whether the operating mode is a generating mode. If the operating mode is determined to be the starting mode, the method can include energizing an excitation winding 220 at (430).

At (440) the method can include energizing a power winding 230 with a switching power converter 170. Power winding 230 can be configured to accommodate power flow through the rotating field machine 200.

At (450) the method can include operating the power converter 170 to start the rotating field machine 200. After starting the rotating field machine 200, the method can loop back to (410) to obtain a signal indicative of the operating mode. The method can perform step (420) again to determine if the signal is indicative of the starting mode and proceed to (460) after determining that the signal is not indicative of the starting mode.

At (460) the method can include determining whether the signal obtained is indicative of a generating mode. If the signal obtained is for the generating mode, the method can proceed to operate the machine 200 in the generating mode.

At (470) the method can include energizing the excitation winding 220 with the power converter 170. The excitation winding 220 can correspond to d-axis current and d-axis power.

At (480) the method can include decoupling the power winding 230 from the power converter 170. The power winding 230 can be associated with q-axis current and q-axis power. As discussed above in FIG. 3, the q-axis current (and q-axis power) can be greater than the d-axis current (and d-axis power). As a result, decoupling the power winding 230 from the power converter 170 can allow the power converter 170 to deal with a reduced amount of the total power.

At (490) the method can include coupling the power winding 230 to a variable frequency constant voltage bus. In another example embodiment, the power winding 230 can be coupled to a DC bus via a diode bridge rectifier 160. As a result, the generated power can be controlled by the excitation winding 220 only.

At (492) the method can include operating the power converter 170 to manage excitation current flowing in the excitation winding 220 to control a generated power in the power winding 230. As shown in plot diagram 300, the d-axis current (and the d-axis power) can be lower than the q-axis current (and q-axis power). The d-axis voltage can be lower than q-axis voltage which can lead to more advantages on apparent power V*I.

Figure 5:
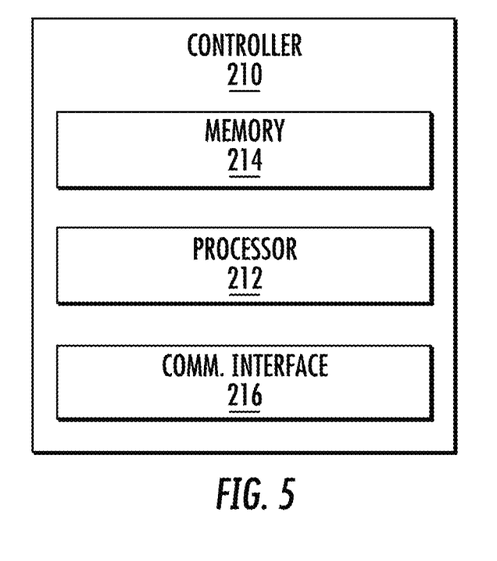
FIG. 5 depicts an example control device for a power converter according to example embodiments of the present disclosure.

FIG. 5 depicts an example control device 210 (e.g., one or more controllers) according to example aspects of the present disclosure. As shown in FIG. 1, the control device 210 can be coupled to power converter 170.

The control device 210 can be used, for example, as a control device 210 for power converter 170. The control device 210 can include one or more processor(s) 212 and one or more memory device(s) 214. The one or more processor(s) 212 can include any suitable processing device, such as a microprocessor, microcontrol device, integrated circuit, logic device, and/or other suitable processing device. The one or more memory device(s) 214 can include one or more computer-readable media, including, but not limited to, non-transitory computer-readable media, RAM, ROM, hard drives, flash drives, and/or other memory devices.

The one or more memory device(s) 214 can store information accessible by the one or more processor(s) 212, including computer-readable instructions that can be executed by the one or more processor(s) 212. The instructions can be any set of instructions that when executed by the one or more processor(s) 212, cause the one or more processor(s) 212 to perform operations. In some embodiments, the instructions can be executed by the one or more processor(s) 212 to cause the one or more processor(s) to perform operations, such as any of the operations and functions for which the control device 210 is configured. For instance, the operations can be used for controlling power converter 170 (e.g., control method 400), as described herein, and/or any other operations or functions of the one or more control device 210. The instructions can be software written in any suitable programming language or can be implemented in hardware. Additionally, and/or alternatively, the instructions can be executed in logically and/or virtually separate threads on processor(s) 212. The memory device(s) 214 can further store data that can be accessed by the processor(s) 212. For example, the data can include data indicative of power flows, current flows, temperatures, actual voltages, nominal voltages, gating commands, switching patterns, and/or any other data and/or information described herein.

The control device 210 can also include a communication interface 216 used to communicate, for example, with the other components of machine 200 (e.g., via a network). The communication interface 216 can include any suitable components for interfacing with one or more network(s), including for example, transmitters, receivers, ports, control devices, antennas, and/or other suitable components. For example, the communication interface 216 can be configured to communicate with one or more sensors or voltage sensors or temperature sensors. Further, the communication interface 216 can be configured to communicate with a control device, such as a control device 210.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotating field machine, the rotating field machine comprising:
   a stator;
   a rotor, the rotor being mounted for rotation with respect to the stator;
   wherein the stator comprises:
      a first winding, the first winding being an excitation winding configured to receive an excitation current; and
      a second winding physically decoupled from the first winding, wherein the second winding is a power winding configured to accommodate power flow through the rotating field machine;
   wherein the excitation winding and the power winding are located in the stator such that the excitation winding and power winding are in electrical quadrature with respect to one another;
   wherein the excitation winding is associated with a d-axis current and the power winding is associated with a q-axis current for the rotating field machine, the first winding 90° out of electrical phase with respect to the second winding;
   the rotating field machine further comprising a power converter and a control device, the control device being configured to operate the rotating field machine in either a starting mode or a generating mode, wherein the control device is configured so that, during the starting mode, both the excitation winding and the power winding are coupled to the power converter, and is further configured so that, in the generating mode, the power winding is decoupled from the power converter.

2. The rotating field machine of claim 1, wherein the power winding is coupled to a DC bus via a bridge rectifier.

3. The rotating field machine of claim 1, wherein during a generating mode, the power winding is coupled to a variable frequency constant voltage bus.

4. The rotating field machine of claim 2, wherein a control device is configured to control the power converter to manage excitation current flowing in the excitation winding to control a generated power in the power winding.

5. A control system for operating a rotating field machine, the rotating field machine comprising a stator and a rotor, the rotor being mounted for rotation with respect to the stator, the stator comprising an excitation winding configured to receive an excitation current and a power winding physically decoupled from the excitation winding and configured to accommodate power flow in the rotating field machine, the control system configured to perform operations, the operations comprising:
   determining to operate the rotating field machine in a starting mode;
   wherein during the starting mode, the operations comprise:
      energizing the excitation winding and the power winding with one or more power converters; and
      operating the one or more power converters to start the rotating field machine;
   determining to operate the rotating field machine in a generating mode;
   wherein during the generating mode, the operations comprise:
      decoupling the power winding from the one or more power converters; and
      operating the one or more power converters to manage excitation current flowing in the excitation winding to control a generated power in the power winding;
   wherein the excitation winding and the power winding are located in the stator such that the excitation winding and power winding are in electrical quadrature with respect to one another;
   wherein the excitation winding is associated with a d-axis current and the power winding is associated with a q-axis current for the rotating field machine, and wherein the excitation winding is 90° out of electrical phase with respect to the power winding.

6. The control system of claim 5, wherein during the generating mode, the operations comprise coupling the power winding to a DC bus via a rectifier.

7. The control system of claim 5, wherein during the generating mode, the operations comprise coupling the power winding to an AC bus.

8. A method of operating a rotating field machine, the rotating field machine comprising a stator and a rotor, the rotor being mounted for rotation with respect to the stator, the stator comprising an excitation winding configured to receive an excitation current and a power winding physically decoupled from the excitation winding and configured to accommodate power flow in the rotating field machine, the method comprising:
   determining to operate the rotating field machine in a starting mode;

wherein during the starting mode, the method comprises:
  energizing the excitation winding and the power winding with a power converter; and
  operating the power converter to start the rotating field machine;
determining to operate the rotating field machine in a generating mode;
  wherein during the generating mode, the method comprises:
    decoupling the power winding from the power converter; and
    operating the power converter to manage excitation current flowing in the excitation winding to control a generated power in the power winding;
wherein the excitation winding and the power winding are located in the stator such that the excitation winding and power winding are in electrical quadrature with respect to one another; and
wherein the excitation winding is associated with a d-axis current and the power winding is associated with a q-axis current for the rotating field machine, and wherein the excitation winding is 90° out of electrical phase with respect to the power winding.

9. The method of claim 8, wherein the excitation winding and the power winding are located in the stator such that the excitation winding and power winding are in electrical quadrature with respect to one another.

10. The method of claim 8, wherein during the generating mode, the method comprises coupling the power winding to a DC bus via a rectifier.

11. The method of claim 8, wherein during the generating mode, the method comprises coupling the power winding to an AC bus.

* * * * *